(12) United States Patent
Gunnarsson et al.

(10) Patent No.: US 9,807,660 B2
(45) Date of Patent: Oct. 31, 2017

(54) LOAD SHARING IN A CELLULAR RADIO COMMUNICATION SYSTEM

(71) Applicant: Telefonaktiebolaget L M Ericsson (publ), Stockholm (SE)

(72) Inventors: Fredrik Gunnarsson, Linköping (SE); Andreas Bergström, Vikingstad (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/896,681

(22) PCT Filed: Jun. 13, 2013

(86) PCT No.: PCT/EP2013/062264
§ 371 (c)(1),
(2) Date: Dec. 8, 2015

(87) PCT Pub. No.: WO2014/198318
PCT Pub. Date: Dec. 18, 2014

(65) Prior Publication Data
US 2016/0135102 A1 May 12, 2016

(51) Int. Cl.
*H04W 24/00* (2009.01)
*H04W 36/22* (2009.01)
(Continued)

(52) U.S. Cl.
CPC .......... *H04W 36/22* (2013.01); *H04W 24/02* (2013.01); *H04W 28/08* (2013.01); *H04W 36/30* (2013.01)

(58) Field of Classification Search
USPC .............. 370/331, 332, 333, 334; 455/432.1, 455/435.3, 436–453, 456.1–456.3
See application file for complete search history.

(56) References Cited

U.S. PATENT DOCUMENTS

2010/0061344 A1* 3/2010 Goransson ........... H04B 7/0697
370/335
2012/0122492 A1* 5/2012 Zhou ................. H04W 36/0083
455/456.6

(Continued)

OTHER PUBLICATIONS

Kikuchi, K., et al., "Proposal of Adaptive Control CRE in Heterogeneous Networks", 2012 IEEE 23rd Intenational Symposium on Personal, Indoor and Mobile Radio Communications—(PIMRC), Sep. 9, 2012, pp. 910-914, IEEE.

*Primary Examiner* — Dai A Phuong
(74) *Attorney, Agent, or Firm* — Coats & Bennett, PLLC

(57) ABSTRACT

The present disclosure relates to facilitating load sharing between a serving cell and a neighboring cell of a cellular radio communication system. The serving cell serves a plurality of radio devices. A network node of the cellular radio communication system defines a first group of radio devices. The first group is a sub-group of the plurality of radio devices served by the serving cell. The network node associates the first group of radio devices with a load sharing boundary to a load sharing zone between the serving cell and the neighboring cell. Beyond the load sharing boundary, the radio devices in the first group are regarded as being able to be handed over to the neighboring cell. The network node gathers statistics relating to connection failures experienced by the radio devices in the first group and adjusts the load sharing boundary based on the gathered statistics.

15 Claims, 2 Drawing Sheets

(51) Int. Cl.
*H04W 24/02* (2009.01)
*H04W 28/08* (2009.01)
*H04W 36/30* (2009.01)

(56) References Cited

U.S. PATENT DOCUMENTS

| | | | | |
|---|---|---|---|---|
| 2012/0276900 | A1* | 11/2012 | Stephens | H04W 24/02 455/436 |
| 2013/0045749 | A1* | 2/2013 | Sridhar | H04W 36/0083 455/443 |
| 2013/0109383 | A1* | 5/2013 | Voyer | H04W 48/14 455/435.1 |
| 2013/0150084 | A1* | 6/2013 | Kolhe | H04W 64/00 455/456.2 |
| 2014/0206359 | A1* | 7/2014 | Vasudevan | H04W 36/22 455/439 |
| 2015/0223258 | A1* | 8/2015 | Jung | H04W 48/12 455/452.1 |

* cited by examiner

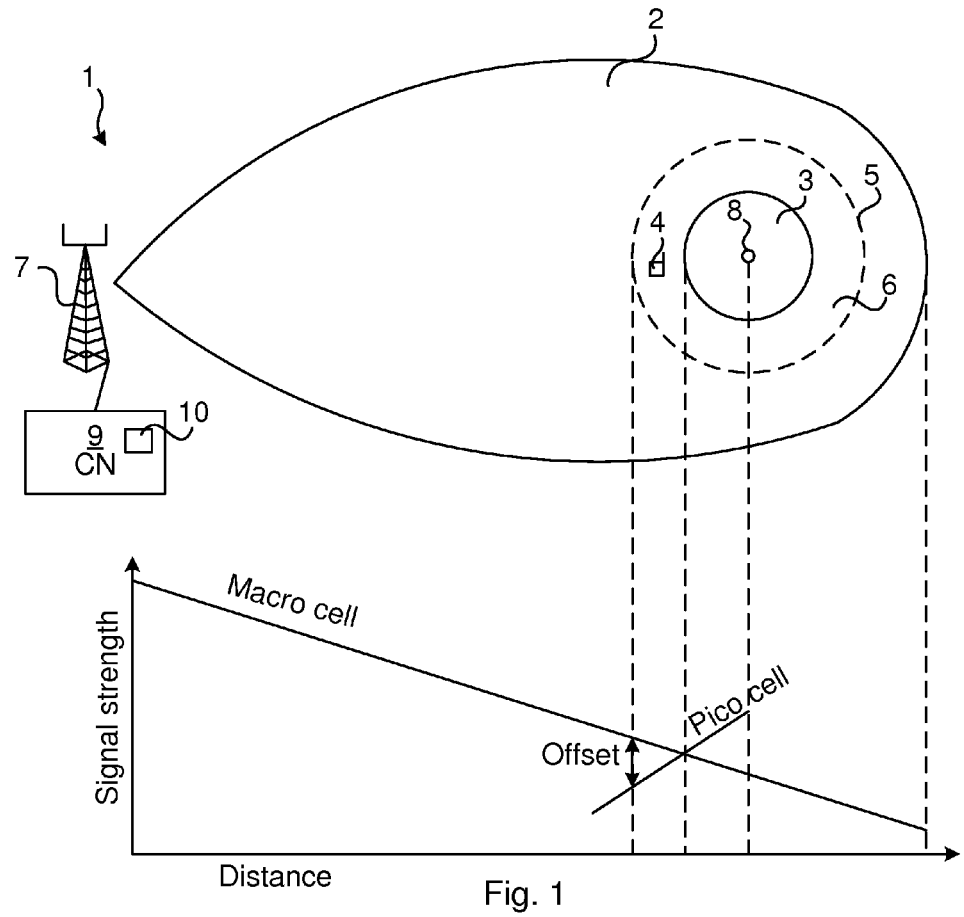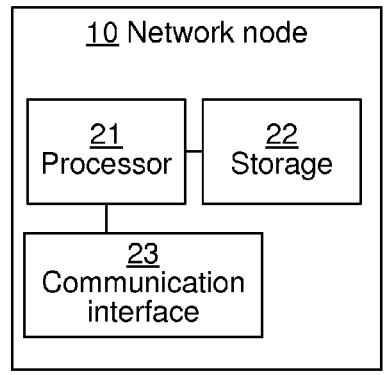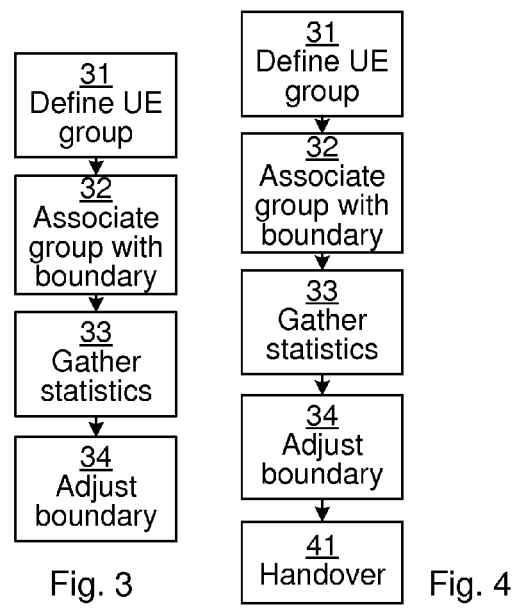
Fig. 1
Fig. 2
Fig. 3
Fig. 4

LOAD SHARING IN A CELLULAR RADIO COMMUNICATION SYSTEM

TECHNICAL FIELD

The present disclosure relates to a method and a network node of a cellular radio communication system for facilitating load sharing between a serving cell and a neighbouring cell of the cellular radio communication system.

BACKGROUND

Range expansion (RE) also known as cell range expansion (CRE) is a useful feature in Long Term Evolution (LTE) heterogeneous network deployments. To meet expectations and predictions for high data rates and traffic capacity, the use of multiple low-output power sites to complement a macro cell has been developed, resulting in a heterogeneous network. The cells of the low-power nodes are sometimes referred to as micro or pico cells. Traditionally, a terminal connects to the node from which the downlink signal strength is the strongest. Due to differences in transmission power, this strategy does not necessarily result in that the terminal connects to the node with the lowest path loss, thereby selecting a node that does not provide the best uplink data rates.

The uptake area of a low-power node can be expanded without increasing the output power of the node by adjusting a cell selection offset to the received downlink signal strength during handling of the cell selection procedures. Such increase in the uptake area of a node is sometimes referred to as range expansion, range extension or cell selection offset. One purpose for doing RE may be to offload the macro cell by load sharing with the micro/pico node. If terminals are connecting to low-power nodes, the high-power node capacity is saved for other terminals to use. RE can therefore dynamically be applied to balance load between different layers (macro, micro and pico layers in a radio access network, RAN).

Another purpose for doing RE may be to improve the uplink (UL) performance for a User Equipment (UE) in a transition zone. The transition zone is the zone in which the downlink (DL) signal strength from the macro cell base station is higher than the DL signal strength from the micro/pico cell base station, but the path loss to the micro/pico cell base station is lower than to the macro cell base station. RE thereby improves the uplink received signal and link bitrate for the UEs that are subjects for the RE.

However, as a drawback RE degrades the DL. This is due to the fact that the UEs are connecting to the low power node, resulting in lower received signal strength and lower link bitrate in the DL, or more precisely bitrate per channel use. Moreover, for large RE the control signalling, such as synchronization signals, Cell-specific Reference Signals (CRS), from the macro cell can cause severe interference to UEs, connected to the micro/pico cell, within in the transition zone.

RE is typically applied by setting a cell selection offset parameter to a desired value. In the Third Generation Partnership Program (3GPP) standard "Radio Resource Control (RRC)", technical specification (TS) 36.331, sections. 5.5.4.4 and 6.3.5., this parameter is called "cellIndividualOffset".

When RE is applied, the typical approach is to modify the cell selection offset parameter for all UEs, which results in that all UEs in the transition zone will make a handover to the micro/pico node. This means that these UEs will experience more interference in DL from interfering nodes compared to what they experienced before the handover. Therefore, the total gain in radio resource utilization by applying RE is dependent on how capable the UEs are to mitigate interference. Thus, if there is a large fraction of UEs in the transition zone that are poor at interference suppression, then the decision of applying RE may become costly in terms of radio resources. In some scenarios a predicted gain may even result in a loss.

For UEs supporting release 10 of the 3GPP specifications, there will be some UEs having good interference suppression capability. Those UEs will likely belong to a new UE class, or category, of UEs supporting larger RE than other UEs. RE based on UE class can thus be performed by modifying the cell selection offset parameter only for UEs belonging to such a UE class. However, although two UEs belong to the same UE class there can still be large differences in their interference suppression capabilities.

A general problem with application of range expansion in prior art cellular communication systems is how to efficiently utilize the network and UE capabilities in order to have an effective mechanism for load sharing between different base station nodes in a RAN.

SUMMARY

It is an objective of the present disclosure to provide method and device for improved load sharing between different base station nodes in a RAN by facilitating the identification of radio devices (called user equipments (UEs) in 3GPP standards) suitable and available for load sharing between neighbouring radio communication cells.

According to an aspect of the present disclosure, there is provided a method performed in a network node of a cellular radio communication system for facilitating load sharing between a serving cell and a neighbouring cell of the cellular radio communication system. The serving cell serves a plurality of radio devices. The method comprises defining a first group of radio devices, which first group is a subgroup of the plurality of radio devices served by the serving cell. The method also comprises associating the first group of radio devices with a load sharing boundary to a load sharing zone between the serving cell and the neighbouring cell, beyond which load sharing boundary any of the radio devices in the first group is regarded as being able to be handed over to the neighbouring cell. The method also comprises gathering statistics relating to connection failures experienced by the radio devices in the first group. The method also comprises adjusting the load sharing boundary based on the gathered statistics.

According to another aspect of the present disclosure, there is provided a computer program product comprising computer-executable components for causing a network node to perform an embodiment of the method of the present disclosure when the computer-executable components are run on processor circuitry comprised in the network node.

According to another aspect of the present disclosure, there is provided a network node in a cellular radio communication system, configured for facilitating load sharing between a serving cell and a neighbouring cell of the cellular radio communication system when the serving cell serves a plurality of radio devices. The network node comprises processor circuitry, and a storage unit storing instructions that, when executed by the processor circuitry, cause the network node to define a first group of radio devices, which first group is a subgroup of the plurality of radio devices served by the serving cell. The instructions then also cause the network node to associate the first group of radio devices with a load sharing boundary to a load sharing zone between the serving cell and the neighbouring cell, beyond which load sharing boundary any of the radio devices in the first group is regarded as being able to be handed over to the neighbouring cell. The instructions also cause the network node to gather statistics relating to connection failures experienced by the radio devices in the first group. The instructions also cause the network node to adjust the load sharing boundary based on the gathered statistics. The network node may be used for performing an embodiment of the method of the present disclosure.

According to another aspect of the present disclosure, there is provided a computer program for facilitating load sharing between a serving cell and a neighbouring cell of a cellular radio communication system when the serving cell serves a plurality of radio devices. The computer program comprises computer program code which is able to, when run on processor circuitry in a network node, cause the network node to define a first group of radio devices, which first group is a subgroup of the plurality of radio devices served by the serving cell. The code then also causes the network node to associate the first group of radio devices with a load sharing boundary to a load sharing zone between the serving cell and the neighbouring cell, beyond which load sharing boundary any of the radio devices in the first group is regarded as being able to be handed over to the neighbouring cell. The code also causes the network node to gather statistics relating to connection failures experienced by the radio devices in the first group. The code also causes the network node to adjust the load sharing boundary based on the gathered statistics. The computer program may be used such that it is stored in a storage unit and as needed run on processor circuitry in an embodiment of the network node of the present disclosure, causing the node to perform an embodiment of the method of the present disclosure.

According to another aspect of the present disclosure, there is provided a computer program product comprising an embodiment of the computer program of the present disclosure and a computer readable means on which the computer program is stored.

By means of the aspects of the present disclosure, load sharing between the serving cell and the neighbouring cell is facilitated and may be improved. Currently, there are existing requirements in 3GPP TS 36.133 for discovering non-serving cells for different UE capabilities. Such requirements could be used to set the event triggering offset based on UE capability information. However, these requirements are not describing the situation when performing random access to a non-serving cell, nor receiving the handover command at scenarios where the UE is not being served by the favourable cell. In practice, the actual handover capability of UEs may be dependent on UE type, but also on the radio network deployment and radio conditions. By grouping radio devices (also called UEs) served by the serving cell, and gathering link failure statistics for that group, the load sharing boundary may be adjusted for that group of radio devices without having to regard other radio devices outside of that group. Different radio devices in different groups may thus be configured with different load sharing boundaries between the serving cell and the neighbouring cell, improving the load sharing ability and reducing the risk of connection failures, such as radio link failures and/or handover failures. Further, the grouping of radio devices provides information to the communication system (e.g. to the network node) about which radio devices are available for load sharing by handover to the neighbouring cell (by those radio devices having passed beyond the load sharing boundary with which they are associated based on in which group each of them is defined). It should be noted that in some cases all radio devices currently served by the serving cell may belong to the same defined group, while in other cases the radio devices currently served by the serving cell may be divided into two or more different defined groups. It should also be noted that by passing beyond its associated load sharing boundary, i.e. by residing in the load sharing zone defined for the group it belongs to, a radio device is available for load sharing. This does however not mean that load sharing by handover to the neighbouring cell occurs, but rather that such load sharing is possible and can be executed if the communication system, e.g. the network node and/or the RAN node providing the serving cell so desires, e.g. due to high load in the serving cell.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 1 schematically illustrates an embodiment of a communication system in accordance with the present disclosure, and also shows a schematic graph illustrating the pilot signal strengths from and within the serving and neighbouring cells, respectively.

FIG. 2 is a schematic block diagram of an embodiment of a network node of the present disclosure.

FIG. 3 is a schematic flow chart of an embodiment of a method of the present disclosure.

FIG. 4 is a schematic flow chart of another embodiment of a method of the present disclosure.

DETAILED DESCRIPTION

Figure 6:
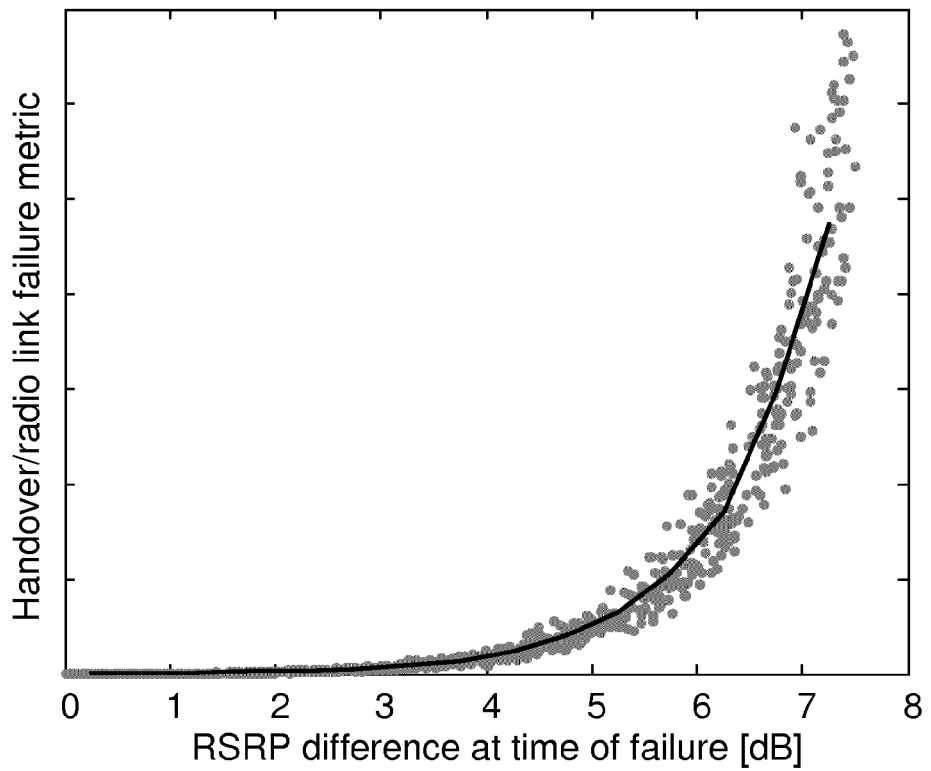
FIG. 6 is a graph showing difference in reference signal received power (RSRP) at time of link failure.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 1 schematically illustrates an embodiment of a communication system 1 in accordance with the present disclosure. Here, embodiments of the present disclosure are illustrated with a serving macro cell 2 and a neighbouring pico cell 3, with a load sharing zone 6 there between.

However, it should be noted that in other embodiments of the present disclosure, the serving cell 2 and the neighbouring cell 3, respectively, may be any type of cell. For instance, both the serving and neighbouring cells may be macro cells, or micro/pico cells, with a load sharing zone 6 there between.

A cell, e.g. the serving and neighbouring cells 2 and 3 used as examples herein, may be associated to one or more of an operational carrier, a radio access technology (RAT), an antenna system, a transmission power, a pilot or reference signal, etc. A cell may also/alternatively refer to the coverage area of a base station (RAN node) or antenna point, or the joint coverage area of multiple base stations of antenna points. The cell may be in operation to serve all, or only a subset of the radio devices 4 in a coverage area of a base station. In the examples herein, all cells are associated to the same operational carrier and LTE is used as radio access technology. However, the present disclosure is equally applicable if the cells are differently configured.

In the embodiment of FIG. 1, a macro RAN node 7 provides a serving cell 2. The RAN nodes providing cells discussed herein are radio base stations e.g. evolved Node B (eNB). A pico (or micro) RAN node 8 provides a neighbouring cell 3. It is noted that the serving RAN node 7 may also provide additional cell(s), e.g. in accordance with other radio communication standard(s), which may in other embodiments of the present disclosure be regarded as neighbouring cell(s) in accordance with the present disclosure. Also, in other embodiments of the present disclosure, the neighbouring cell may be provided by another macro RAN node, and/or the serving RAN node is a pico or micro node.

A radio device 4 is located within and served by the serving cell 2. The radio device 2 may be any device or UE, mobile or stationary, enabled to communicate over a radio channel in the communications network 1, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or personal computer (PC).

As schematically illustrated by means of a graph in the lower part of FIG. 1, graphically linked to the illustration of the communication system 1, the pilot signal strength in the macro cell 2 and pico cell 3, respectively, decreases with the distance from the respective RAN node 7 or 8 over the respective cell 2 or 3 area. The node 7 providing the macro cell 2 (the macro node 7) transmits with a much higher strength than the node 8 providing the pico cell 3 (the pico node 8), whereby the macro cell 2 covers a much larger area then the pico cell 3. Although the pico cell 3 is positioned within the macro cell 2, the pilot strength from the pico node 8 is stronger than from the macro node 7 close to the pico node, forming the pico cell 3. Since the cells 2 and 3 operate with different pilot power levels, there can be imbalances between uplink (UL) and downlink (DL) in the network. The reason is that cells are typically selected based on received signal strength, which means that radio devices 4 are served by the best downlink cell alternative. However, the uplink depend mainly on the distance between the radio device 4 and the RAN node 7 or 8, i.e. independent of the pilot power. This means that with cell selection based on the downlink pilot, radio devices may have a better uplink to a non-serving node 8. In such case a different solution called Cell Range Extension (CRE) is used according to the standard. According to this solution the radio device 4 served by the macro cell 2 is configured by the macro node 7 to be able to detect cell 8 although its pilot signal strength is lower and normally would not be detected. For example, such cells may be those with a pilot signal less than 6 dBs lower than the pilot signal of the macro cell. The extended area 6 within which the radio device 4 can detect pico cell 3 with a pilot signal below e.g. such threshold is called the load sharing zone 6 of the pico cell in accordance with the present disclosure and may correspond to a CRE area. In order to detect, and report measurements made on, a neighbour cell with such pilot signal strength, the radio device 4 will need to be configured by the macro node 7 with a specific measurement Offset, as shown in the graph of FIG. 1. Once the pico cell 3 is detected by the radio device 4 and reported to the macro node 7, the macro node 7 is able to decide to handover the radio device 4 to the detected pico cell 3. Such handover might be preceded by allocation of so called Almost Blank Subframes (ABS) by the macro node (see TS 36.331 and TS 36.423). ABSs are "protected subframes", namely subframes where the macro node 7 limits its transmission. Therefore, a small cell 3 neighbouring the macro node 7 will experience reduced interference on such ABS subframes. Once the radio device 4 is handed over to the pico cell 3, the pico node 8 may decide to serve the radio device 4 on ABSs, due to the otherwise high DL interference the radio device 4 would experience from the macro node 7. Further, the radio device 4 should be configured by the pico node 8 to measure neighbouring cells on ABSs. This will ensure that the measurements are not impacted by high levels of macro DL interference. In accordance with the present disclosure, the CRE area 6 is regarded as a load sharing zone 6, delimited by a load sharing boundary 5 outside of the DL defined pico cell 3, which is associated with a group of radio devices 4, within which zone 6 a radio device 4 of that group is available for load sharing/handover if desired. It is noted that CRE is only one way of defining the load sharing zone 6, and other ways (independent of the standard CRE) are also contemplated for embodiments of the present disclosure.

The RAN nodes 7 and 8 are connected to a core network (CN) 9, possibly via the Internet. A network node 10 which is configured to perform the method of the present disclosure is present in the communication system 1. In FIG. 1, the network node 10 is illustrated to reside within the CN. However, the network node 10 may in other embodiments reside e.g. in the serving RAN node 7, in a radio network controller (RNC) or a base station controller (BSC), or in an operations, administration and management (OAM) node.

Of course, the communication system 1 may be considerably more complex, e.g. with multiple neighbouring cells 3 which may interfere with/be interfered by the serving cell 2 as well as each other. There may thus be several load sharing boundaries 5 of the first group in the serving cell 2, one for each neighbouring cell 3.

In some embodiments of the present disclosure, the adjusting of the load sharing boundary 5 comprises adjusting the load sharing boundary in view of an allowed connection failure ratio, e.g. an allowed radio link failure ratio or handover failure ratio or a combination thereof. By means of the gathering of statistics, and possibly from other sources, the risk of connection failure at e.g. different distances from the neighbouring cell 3 or pilot signal strengths from the neighbouring cell 3 can be predicted. Based on this prediction and on a predetermined allowed connection failure ratio, the load sharing boundary can be adjusted accordingly.

In some embodiments of the present disclosure, the defining a first group of radio devices 4 comprises dividing the plurality of radio devices 4 served by the serving cell 2 into at least a first group and a second group. Thus, a plurality of different groups may be defined, and may be associated with different load sharing boundaries 5. In some embodiments, the dividing the plurality of radio devices 4 comprises dividing the radio devices into the groups based on any of connection status, mobility pattern, quality of service configuration for active bearers, service or application used, and/or capabilities of the plurality of radio devices. These are some characteristics of the radio devices which may conveniently be used for dividing the radio devices 4 into the different groups.

In some embodiments of the present disclosure, the gathering of connection failure statistics comprises receiving information about signal quality e.g. reference signal received power (RSRP) and/or reference signal received quality (RSRQ); type of connection failure e.g. handover failure or radio link failure (non-handover failure); cause of connection failure e.g. expiration of a timer, reaching maximum number of RLC retransmissions or random access channel failure; number of connection failures during a predetermined time period; number of connection failures per radio device 4 in the first group; and/or number of connection failures per radio device 4 when positioned in the load sharing zone 6; experienced by the radio devices 4 in the first group. These are examples of failure statistics which may be used for adjusting the load sharing boundary.

In some embodiments of the present disclosure, the network node 10 is comprised in a serving radio access network (RAN) node 7 providing the serving cell 2, in a radio network controller (RNC) or a base station controller (BSC), or in an operations, administration and management (OAM) node.

In some embodiments of the present disclosure, a handover is performed from the serving cell 2 to the neighbouring cell 3, of a radio device 4 comprised in the first group when said radio device is beyond the load sharing boundary 5 (i.e. when the device 4 is in the load sharing zone 6). As noted above, a handover may be performed for load sharing if needed, but the communication system 1 e.g. the network node 10 may alternatively decide not to handover the radio device 4 if load sharing is not needed or desired.

FIG. 2 is a schematic block diagram of an embodiment of a network node 10 of the present disclosure. As discussed in relation to FIG. 1, the network node 10 may e.g. be comprised in the serving RAN node/base station 7 providing the serving cell 2 or in another part of the communication system 1 such as in the CN 9. The network node 10 comprises a processor 21 e.g. a central processing unit (CPU). The processor 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor 21 is configured to run one or several computer program(s) or software stored in a storage unit 22 e.g. a memory. The storage unit is regarded as a computer readable means and may e.g. be in the form of a Random Access Memory (RAM), a Flash memory or other solid state memory, or a hard disk. The processor 21 is also configured to store data in the storage unit 22, as needed. The network node 10 also comprises a communication interface 23 which may comprise a transmitter and a receiver, which may be combined to form a transceiver or be present as distinct units within the communication interface 23. If the communication interface 23 is integrated in or otherwise associated with the RAN node 7 or another node in the communication system 1, the processor of that node may also function as the processor 21 of the network node 10, the storage unit of that node may also function as the storage unit 22 of network node 10, and the transceiver of that node may also function as the communication interface 23 of network node 10. The communication interface 23 is configured to cooperate with the processor to transform data bits to be transmitted over a wired or wireless interface to a suitable signal via which the data bits are to be transmitted, and similarly to cooperate with the processor 21 to transform a received signal to data bits.

As mentioned herein, the network node 10 may be comprised and integrated in the serving RAN node/base station 7. The RAN node 7 may then be arranged with the communication interface 23 in the form of radio circuitry to communicate with served radio devices 4 and communication circuitry for communicating with other RAN and CN nodes, and the storage unit 22 and the processor circuitry 21 may be a memory and a processor, respectively, of the RAN node 7. The communication circuitry 23 may then be configured to receive information about radio devices 4 from other RAN nodes/base stations. Such information may comprise RLF report(s), handover failure information and radio resource utilization, etc. The processor circuitry 21 may be configured to use the collected information about first group of radio devices for deriving the optimal load sharing boundaries for said first group. The memory 22 may be configured to store information about served radio devices 4, as well as information about neighbouring cells 3. The radio circuitry, which may be part of the communication interface 23, may be configured to communicate with served radio devices 4, including configuring and reconfiguring measurement reporting from such radio devices 4.

FIG. 3 is a schematic flow chart of an embodiment of the method of the present disclosure. The method is performed in the network node 10 of the cellular radio communication system 1. An objective of the method is for facilitating load sharing between the serving cell 2 and the neighbouring cell 3 of the cellular radio communication system when the serving cell 2 serves a plurality of radio devices 4.

A first group of radio devices 4 is defined 31, which first group is a subgroup of the plurality of radio devices served by the serving cell 2. The first group of radio devices 4 may thus comprise all, some or one of the radio devices 4 served by the serving cell 2. Additional group(s) may also be defined, e.g. a second group, third group etc. of other radio devices 4 outside the first group. The groups may be defined based on capabilities of the radio devices and/or the RAN and criteria governing which radio device 4 should belong to which defined group may be set by the network node 10 or higher up in the communication system 1 e.g. by a node in the CN 9.)

The first group of radio devices 4 is associated 32 with a load sharing boundary 5 to a load sharing zone 6 between the serving cell 2 and the neighbouring cell 3. Beyond the load sharing boundary (i.e. as the radio device 4 closes in on the neighbouring cell 3), any of the radio devices in the first group is regarded as being able to be handed over to the neighbouring cell. Thus, the same load sharing boundary 5 is associated with each radio device 4 in the first group. Similarly, if there is a second group, all radio devices 4 belonging to said second group are associated with the same load sharing boundary which may be different than the load sharing boundary 5 associated with the first group. Once a radio device 4 passes (towards the neighbouring cell 3) the load sharing boundary 5 with which it is associated (depending on which group it belongs to), load sharing is possible if desired, by handing over the radio device 4 to the neighbouring cell.

Statistics relating to connection failures experienced by the radio devices 4 in the first group are gathered 33. Similarly, if there is a second group, statistics relating to connection failures experienced by the radio devices 4 in the second group may be gathered. The term "connection failure" here includes handover failures as well as radio link failures which are not related to a handover. Radio link failures which are due to a lack of coverage of the communication system might be disregarded, since such failures are not due to interference. As discussed herein, the statistics may e.g. relate to measured DL signal quality directly before the failure and/or to the frequency of occurrence of connection failures e.g. in association with handovers to the neighbouring cell 3.

The statistics may be gathered 33 e.g. by means of reports from radio devices 4 in connection with Radio Resource Control (RRC) connection re-establishment. When a radio connection fails and the RRC connection between a radio device 4 and the RAN is lost, the radio device can try to re-establish the RRC connection [3GPP 36.331]. The radio device can include information about the failure cause, but also indicate that if it has stored information from the time of failure. The radio device may also indicate the connection failure type as either radio link failure or handover failure, where the latter means a radio link failure, but after a handover command has been received from the serving cell 2. A radio link failure is determined based on serving cell quality, and if the received quality is observed to be less than a threshold for at least a configurable time T310, then the lower layers in the radio device indicates radio link failure to its higher layers, and a re-establishment procedure is initiated. At a later stage, the serving base station may request the stored information via e.g. a UE Information Request message (and indicate which of the stored information that the request concerns), and the radio device can provide the information via a UE Information Response message including the available information. In particular, the radio device can transmit information about serving 2 and non-serving 3 cell reference signal received power (RSRP) and quality (RSRQ). Also information about the failure cause, in particular if the failure is due to T310 timer expiry, random access channel (RACH) problem or maximum number of radio link control (RLC) re-transmissions.

The load sharing boundary 5 is then adjusted 34 based on the gathered 33 statistics. For instance, if the ratio of connection failures compared with the total number of handovers of radio devices 4 in the first group is too high, e.g. above a predetermined allowed connection failure ratio, then the load sharing boundary 5 may be adjusted to decrease the load sharing zone 6. On the other hand, if the ratio of connection failures is smaller than an allowed connection failure ratio, this may be an indication that the load sharing boundary 5 may be adjusted to increase the load sharing zone. In this way, the load sharing boundary 5 can be dynamically adjusted for the first group of radio devices 4, and independently for any other groups defined, over time as conditions fluctuate or change.

FIG. 4 is a schematic flow chart of another embodiment of the method of the present disclosure. The discussion above in respect of FIG. 3 also applies to the embodiment of FIG. 4. However, the embodiment of FIG. 4 also comprises the additional step of performing 41 a handover from the serving cell 2 to the neighbouring cell 3. The handover is of a radio device 4 comprised in the first group when said radio device is beyond the load sharing boundary 5. In this embodiment, it has first been determined that a radio device 4 has passed the load sharing boundary 5 the group it belongs to is associated with. Thus, the radio device 4 is available for load sharing if needed. It has also been determined that load sharing is desired, possibly due to high load on the serving cell 2 and/or due to low load on the neighbouring cell 3. In view of this, the communication system, e.g. the RAN node 7 providing the serving cell 2, decides to hand over the radio device 4 to the neighbouring cell 3, and performs 41 the required steps for executing the handover.

Figure 5:
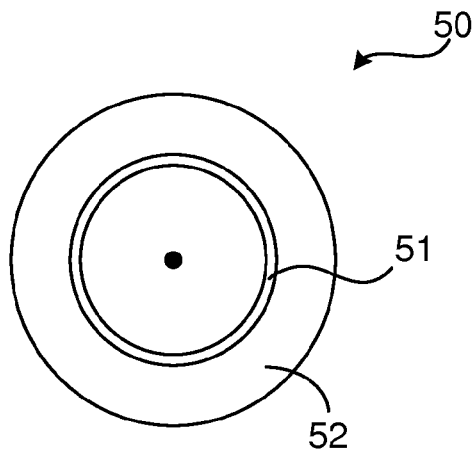
FIG. 5 is a schematic illustration of a computer program product of the present disclosure.

FIG. 5 illustrates a computer program product 50. The computer program product 50 comprises a computer readable medium 52 comprising a computer program 51 in the form of computer-executable components 51. The computer program/computer-executable components 51 may be configured to cause a network node 10, e.g. as discussed above for facilitating load sharing between a serving cell 2 and a neighbouring cell 3 to perform an embodiment of the method of the present disclosure. The computer program/computer-executable components may be run on the processor circuitry 21 of the network node 10 for causing the node to perform the method. The computer program product 50 may e.g. be comprised in a storage unit or memory 22 comprised in the network node 10 and associated with the processor circuitry 21. Alternatively, the computer program product 50 may be, or be part of, a separate, e.g. mobile, storage means, such as a computer readable disc, e.g. CD or DVD or hard disc/drive, or a solid state storage medium, e.g. a RAM or Flash memory.

EXAMPLE 1

The determining of which radio devices are available for load sharing, i.e. are in their respective load sharing zones 6, may be based on measurement report triggering e.g. in analogy with an A3 Event where the neighbour cell 3 DL pilot plus a predetermined offset representing the load sharing boundary associated with a radio device 4 is stronger than the pilot of the serving cell 2.

The radio device 4 shall:

1> consider the entering condition for this event to be satisfied when condition A3-1, as specified below, is fulfilled, 1> consider the leaving condition for this event to be satisfied when condition A3-2, as specified below, is fulfilled, NOTE The cell(s) 3 that triggers the event is on the frequency indicated in the associated measObject which may be different from the (primary) frequency used by the primary cell (PCell).

$$Mn+Ofn+Ocn-Hys>Mp+Ofp+Ocp+Off \quad \text{Inequality A3-1 (Entering condition)}$$

$$Mn+Ofn+Ocn+Hys<Mp+Ofp+Ocp+Off \quad \text{Inequality A3-2 (Leaving condition)}$$

The variables in the formula are defined as follows:

Mn is the measurement result of the neighbouring cell, not taking into account any offsets.

Ofn is the frequency specific offset of the frequency of the neighbour cell 3 (i.e. offsetFreq as defined within measObjectEUTRA corresponding to the frequency of the neighbour cell).

Ocn is the cell specific offset of the neighbour cell 3 (i.e. cellIndividualOffset as defined within measObjectEUTRA corresponding to the frequency of the neighbour cell), and set to zero if not configured for the neighbour cell.

Mp is the measurement result of the PCell, not taking into account any offsets.

Ofp is the frequency specific offset of the primary frequency (i.e. offsetFreq as defined within measObjectEUTRA corresponding to the primary frequency).

Ocp is the cell specific offset of the PCell (i.e. cellIndividualOffset as defined within measObjectEUTRA corresponding to the primary frequency), and is set to zero if not configured for the PCell.

Hys is the hysteresis parameter for this event (i.e. hysteresis as defined within reportConfigEUTRA for this event).

Off is the offset parameter for this event (i.e. a3-Offset as defined within reportConfigEUTRA for this event).

Mn, Mp are expressed in dBm in case of RSRP, or in dB in case of RSRQ.

Ofn, Ocn, Ofp, Ocp, Hys, Off are expressed in dB.

In brief, the radio device 4 measures its serving cell 2 resulting in the measurement Mp, and for each neighbouring cell 3 in the measurement Mn. The entering and leaving conditions can be simplified into Entering: $Mn > Mp + \Delta n + Hys$ Leaving: $Mn > Mp + \Delta n - Hys$ where $\Delta n$ is a cell relation specific offset, and Hys a hysteresis parameter.

EXAMPLE 2

Optional Preliminary Step: Radio Device Categorization and Configuration

In some embodiments, the defining 31 a first group of radio devices comprises the network node 10 itself categorising the radio devices 4, as opposed to the categorizing taking place higher up in the communication system 1 or being predetermined.

One alternative is to separate the radio devices 4 into two groups—one for which load sharing is considered, and one for which load sharing is excluded. Another alternative is to define more groups or subgroups and apply the method of the present disclosure separately for each group or subgroup, separating both statistics and parameters to be adjusted for each group or subgroup.

The first thing to do is to categorize the radio devices 4 into a number of distinct groups, where each such group is assumed to (in the end) have the same optimal load sharing boundary 5.

Referring back to FIG. 1, an example is shown where the radio device 4 is shown to be initially belonging to the macro eNB 7. This radio device 4 is categorized as belonging to the first group of radio devices 4. Upon performing measurements of the neighbouring pico eNB 8, the measurement reporting procedures of the radio device 4 is configured depending on its categorization i.e. the first group for this radio device 4.

The above-mentioned categorization and configuration of radio devices into different groups could be made as follows:
For each and every radio device 4 in the communication system 1, or a defined part thereof, gather information which can be used to classify each radio device 4 (e.g. capabilities, configuration, bearers, service/application etc.).
Classify each radio device 4 as either being suitable for load sharing or not being suitable for load sharing.
For each radio device 4 having been classified as suitable for load sharing, further assign it to a group with similar properties with regard to how large load sharing zones 6 that could be supported (e.g. the size of the CRE measurement offset).

A possible categorization of whether a radio device 4 shall be made subject to load sharing at all (i.e. as in the second step above) could be made based on:
Connection status (RRC_IDLE and/or RRC_CONNECTED)
Mobility Pattern (e.g. user speed, handover history statistics etc.)
Quality of Service (QoS) configuration for the active bearers (e.g. guarantied bit rate (GBR)/non-GBR, conversational)
Service/Application (e.g. voice over internet protocol (VoIP), http-streamed video, background mail sync.

A further sub-categorization (e.g. as in the third step above) could be made based on:
radio device 4 capabilities (e.g. inter-cell interference coordination (ICIC), interference rejection combining (IRC), which 3GPP release it supports, carrier aggregation (CA) etc.)
Settings made by other parts of a Long Term Evolution (LTE) system (e.g. discontinuous reception (DRX) settings etc.)

Note that this categorization can be based on the described entities above as (e.g. the first step above):
Current values
Historical collected statistics
Future predicted values Step 1: Configuring the Radio Device with a Measurement Report Triggering Condition Each radio device 4 in the first group of radio devices is configured with a measurement report triggering condition based on a load sharing boundary 5 information. Such information can be associated to the radio devices in the first group based on the radio device capabilities for example as reported by the radio device 4, possibly in combination with defined measurement requirements. One example of such measurement requirements are provided in [3GPP 36.133], listing requirements for detection and reporting of non-serving cells. The capability may also be associated with the radio device group as described in the preliminary step above. One example of a measurement report triggering condition is given above, where either $\Delta n$, or $\Delta n + Hys$ can be seen as representing a load sharing boundary in the event configuration.

Step 2: Gathering Statistics

In the next step, the statistics related to the group of radio devices 4 are gathered 33. This includes information from the radio link failure (RLF) reports from the first group of radio devices:
RSRP and/or RSRQ values of the serving cell 2 and the neighbouring cells 3 at the time of failure.
Connection failure types being either radio link failures or handover failures.
Connection failure causes, including expiration of the T310 timer (radio link failure), and handover failure causes such as reaching max number of RLC retransmissions, or RACH failure—FIG. 6 illustrates an example of handover and/or radio link failure statistics versus RSRP difference (between a non-serving cell 2 (typically the best [here the macro cell 2 since the radio device is served by the pico cell 3 after handover]) and serving cell 3). The failure statistics can be e.g.
Number of failure events
Number of failure events per number of users in the considered group of radio devices.
Number of failure events in comparison to the number of radio devices in the load sharing zone 6.

Failure events related to a coverage hole are excluded from the evaluation.

The RSRP and RSRQ values of the serving cell and the neighbouring cells can also be obtained through periodic reporting from the radio devices 4. Radio devices 4 may always continuously report the RSRP and RSRQ values in periodic time intervals. In a sometimes better solution, such periodic reporting can be made event triggered. The radio device 4 can be configured to start periodically reporting the RSRP and RSRQ values once it is in the vicinity of the load sharing zone 6.

Relevant information also includes information stored in the previous serving cell 2 comprising uplink reception statistics, uplink path gain as estimated from channel sounding procedures, downlink reception statistics including retransmission statistics etc.

Other information from the previous serving cell 2 includes radio resource utilization: the radio resource utilization of the radio device 4 and also the radio resource utilization in the cells under investigation will be considered.

Step 3: Adjust Load Sharing Boundary

Since load sharing constitutes actions taken to alleviate a load imbalance or an overload situation, it can be acceptable that resulting handovers are more error prone than handovers due to mobility. In one preferred embodiment, the adjustment 34 mechanism is associated with an allowed failure ratio, and the objective with the adjustment mechanism is to tune the load sharing boundary 5 or boundaries to meet the allowed failure ratio while maximizing the load sharing opportunities. For the typical handover triggering configurations, this means maximizing the load sharing boundary 5, and one example configuration is to maximize $\Delta n$ or $\Delta n+Hys$ in the measurement report triggering condition while ensuring that the reference failure rate is met.

As seen in FIG. 6, the handover and/or radio link failure data vs. RSRP difference indicates how the load sharing boundary 5 affects the number of failure events, typically in relation to the number of radio devices 4 in the considered group. It is expected that such a relation is monotonic, meaning that in one exemplifying embodiment, the load sharing boundary 5 is decreased if the handover failure measure is above the reference failure rate, and increased if the handover failure measure is below the reference failure rate.

EXAMPLE 3

As mentioned above, the network node 10 may be comprised or integrated in any of several different nodes in a communication system 1, as convenient depending on the system configuration. Examples of such nodes comprises:
  Serving base station 7
  OaM system node
  Radio access network (RAN) node controlling the serving base station 7.
  Radio network controller (RNC) in Universal Terrestrial Radio Access Network (UTRAN)
  Base station controller (BSC) in GSM EDGE Radio Access Network (GERAN)
  In case of anchor/booster (or anchor/assisting eNB) scenarios, the anchor/macro eNB 7 can act as master and adjust parameters also for booster/assisting eNB.

Below follows another aspect of the present disclosure. According to an aspect of the present disclosure, there is provided a network node 10 in a cellular radio communication system 1, configured for facilitating load sharing between a serving cell 2 and a neighbouring cell 3 of the cellular radio communication system, the serving cell serving a plurality of radio devices 4. The network node comprises means 21 for defining 31 a first group of radio devices 4, which first group is a subgroup of the plurality of radio devices served by the serving cell 2. The network node also comprises means 21 for associating 32 the first group of radio devices 4 with a load sharing boundary 5 to a load sharing zone 6 between the serving cell 2 and the neighbouring cell 3, beyond which load sharing boundary any of the radio devices in the first group is regarded as being able to be handed over to the neighbouring cell. The network node also comprises means 21, 23 for gathering 33 statistics relating to connection failures experienced by the radio devices 4 in the first group. The network node also comprises means 21 for adjusting 34 the load sharing boundary 5 based on the gathered 33 statistics.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for facilitating load sharing between a serving cell and a neighboring cell of a cellular radio communication system, the serving cell serving a plurality of radio devices, the method comprising a network node of the cellular radio communication system:
    defining a first group of radio devices, wherein the first group is a subgroup of the plurality of radio devices served by the serving cell;
    associating the first group of radio devices with a load sharing boundary to a load sharing zone between the serving cell and the neighboring cell, beyond which load sharing boundary any of the radio devices in the first group is regarded as being able to be handed over to the neighboring cell;
    gathering statistics relating to connection failures experienced by the radio devices in the first group; and
    adjusting the load sharing boundary based on the gathered statistics, wherein the adjusting is group-specific so as to account for characteristics of the radio devices within the first group independently of characteristics of radio devices in any other groups of the plurality of radio devices, wherein the load sharing zone supported by the radio devices of the first group is configurable to be of a different size than a load sharing zone supported by another group of radio devices of the plurality of radio devices.

2. The method of claim 1, wherein the adjusting the load sharing boundary comprises adjusting the load sharing boundary in view of an allowed connection failure ratio.

3. The method of claim 1, wherein the defining the first group comprises dividing the plurality of radio devices served by the serving cell into at least a first group and a second group.

4. The method of claim 3, wherein the dividing the plurality of radio devices comprises dividing the radio devices into the groups based on any of: connection status, mobility pattern, quality of service configuration for active bearers, service or application used, and capabilities of the plurality of radio devices.

5. The method of claim 1, wherein the gathering statistics comprises receiving information about at least one of the following experienced by the radio devices in the first group:

signal quality;
type of connection failure;
cause of connection failure;
number of connection failures during a predetermined time period;
number of connection failures per radio device in the first group; and
number of connection failures per radio device when positioned in the load sharing zone.

6. The method of claim 1, wherein the network node is comprised in either a serving radio access network (RAN) node providing the serving cell or a radio network controller (RNC), or a base station controller (BSC), or an operations, administration and management (OAM) node.

7. The method of claim 1, further comprising performing a handover, from the serving cell to the neighboring cell, of a radio device comprised in the first group when the radio device is beyond the load sharing boundary.

8. The method of claim 1, wherein the method further comprises:
determining that a radio device of the first group has passed the load sharing boundary; determining that load sharing is desired;
deciding to hand over the radio device to the neighboring cell; and
performing a handover from the serving cell to the neighboring cell.

9. The method of claim 1, wherein the network node is a network node of a core network.

10. The method of claim 1,
wherein the method further comprises defining a second group of radio devices that is a subgroup of the plurality of radio devices, wherein the second group is comprised of radio devices with different capabilities than radio devices of the first group, and the second group is associated with a second load sharing boundary to a second load sharing zone overlapping with the first load sharing zone, beyond which second load sharing boundary any of the radio devices in the second group is regarded as being able to be handed over to the neighboring cell; and
wherein the adjusted load sharing boundary is different than the second load sharing boundary.

11. A computer program product stored in a non-transitory computer readable medium for facilitating load sharing between a serving cell and a neighboring cell of a cellular radio communication system, the serving cell serving a plurality of radio devices, the computer program product comprising software instructions which, when run on processing circuitry of a network node of the cellular radio communication system, causes the network node to:
define a first group of radio devices, wherein the first group is a subgroup of the plurality of radio devices served by the serving cell;
associate the first group of radio devices with a load sharing boundary to a load sharing zone between the serving cell and the neighboring cell, beyond which load sharing boundary any of the radio devices in the first group is regarded as being able to be handed over to the neighboring cell;
gather statistics relating to connection failures experienced by the radio devices in the first group; and
adjust the load sharing boundary based on the gathered statistics in a group-specific manner so as to account for characteristics of the radio devices within the first group independently of characteristics of radio devices in any other groups of the plurality of radio devices, wherein the load sharing zone supported by the radio devices of the first group is configurable to be of a different size than a load sharing zone supported by another group of radio devices of the plurality of radio devices.

12. A network node in a cellular radio communication system, configured for facilitating load sharing between a serving cell and a neighboring cell of the cellular radio communication system, the serving cell serving a plurality of radio devices, the network node comprising:
processing circuitry; and
memory storing instructions that, when executed by the processing circuitry, cause the network node to:
define a first group of radio devices, wherein the first group is a subgroup of the plurality of radio devices served by the serving cell;
associate the first group of radio devices with a load sharing boundary to a load sharing zone between the serving cell and the neighboring cell, beyond which load sharing boundary any of the radio devices in the first group is regarded as being able to be handed over to the neighboring cell;
gather statistics relating to connection failures experienced by the radio devices in the first group; and
adjust the load sharing boundary based on the gathered statistics in a group-specific manner so as to account for characteristics of the radio devices within the first group independently of characteristics of radio devices in any other groups of the plurality of radio devices, wherein the load sharing zone supported by the radio devices of the first group is configurable to be of a different size than a load sharing zone supported by another group of radio devices of the plurality of radio devices.

13. The network node of claim 12, wherein the memory stores instructions that, when executed by the processing circuitry, cause the network node to:
determine that a radio device of the first group has passed the load sharing boundary;
determine that load sharing is desired;
decide to hand over the radio device to the neighboring cell; and
perform a handover from the serving cell to the neighboring cell.

14. The network node of claim 12, wherein the network node is a network node of a core network.

15. The network node of claim 12, wherein the memory stores instructions that, when executed by the processing circuitry, cause the network node to:
define a second group of radio devices that is a subgroup of the plurality of radio devices, wherein the second group is comprised of radio devices with different capabilities than radio devices of the first group, and the second group is associated with a second load sharing boundary to a second load sharing zone overlapping with the first load sharing zone, beyond which second load sharing boundary any of the radio devices in the second group is regarded as being able to be handed over to the neighboring cell;
wherein the adjusted load sharing boundary is different than the second load sharing boundary.

* * * * *